United States Patent Office 3,574,020
Patented Apr. 6, 1971

3,574,020
METHOD OF EMBOSSING VINYL-COATED FABRICS
Reuben Wisotzky, Lexington, Mass., assignor to Pandel, Inc., Lowell, Mass.
No Drawing. Filed Apr. 27, 1970, Ser. No. 32,383
Int. Cl. B32f 31/22
U.S. Cl. 156—79                                10 Claims

ABSTRACT OF THE DISCLOSURE

A method of providing a variety of embossing designs on a thermoplastic resin-coated fabric material from a single embossing roll surface is provided by interposing one or more thin sheet materials having a different modulus of elasticity than the material to be embossed between the surface of the thermoplastic resin material to be embossed and the embossing surface and during the embossing controlling the tension of the interposed sheet material, thereby providing a variety of surface design effects from a single embossing surface.

BACKGROUND OF THE INENTION

Thermoplastic film material and thermoplastic resin-coated sheet material are often embossed by heating the surface of the material and sending the softened material between a rubber back-up roll and a metal embossing roll, the embossing roll characterized by an engraved surface design, which design is desired to be printed on the softened surface of the thermoplastic resin. In one described method of embossing sheet material as set forth in U.S. Pat. 3,024,154 to F. J. Singleton et al., issued Mar. 6, 1962, a technique and apparatus is described to emboss a thin interposed sheet material with a thicker thermoplastic sheet material employed as a source of sensible heat, and after embossing, stripping the material to provide an embossed thin material and an embossed thick thermoplastic resin material. However, one of the difficulties associated with this process and typical to many embossing processes is that a variation in design to be placed on the embossing surface must be accomplished by removing the embossing roll and substituting therefore, a new embossing design roller which, of course, results in a loss of production time and requires additional capital investment for a variety of embossing rollers. Accordingly, a technique by which a single embossing roller of surface may be employed to produce and emboss thermoplastic resin film or sheet material with a variety of designs would be and is desirable.

SUMMARY OF THE INVENTION

My invention comprises a method of imparting a variety of distinctive and different embossing designs of a random type onto the surface of a thermoplastic resin-coated sheet material such as a vinyl resin-coated fabric employing a single embossing surface and to the embossed product so produced. In particular, my invention concerns and employs the use of an interposed sheet mateiral having a different modulus of elasticity than the material to be embossed between an embossing roller surface and a thermoplastic resin-coated fabric which is to be embossed and controlling the tension of the interposed sheet material during the embossing thereby producing a variety of design patterns on the surface of the thermoplastic resin-coated material. I have found that unexpecting and surprising, natural and random embossing surface results can be achieved by employing a single embossing surface such as a metal plate or a roller through the varying and controlling of the tension of an interposed sheet material.

Generally, interposed sheet materials between a roller and a thermoplastic film are employed to impart a highly polished surface to the thermoplastic film or to be embossed themselves, that is, to follow the contours of an embossing surface on an embossing roller. However, I have found that by controlling the tension of such interposed material such as through a braking device on the unwind axis of the interposed material, thereby imparting a force in the machine direction, that the thermoplastic film material to be embossed is prevented from coming into full and complete contact with the embossing surface. By such technique, different random designs may be obtained from the surface of a single embossing roller depending upon the degree of elongation or tension applied to the interposed sheet material. My method is particularly useful in the production of vinyl resin-coated fabrics of both cellular and noncellular nature, which fabrics are to be employed as a covering surface, for example, in shoes, boots, handbags, jackets, upholstery, wall covering and the like.

In one embodiment, my method may be carried out by employing a pony brake on the unwind axis of the interposed sheet material feeding to the embossing roller. The use of the brake prevents the free or uncontrolled unwinding of the material and provides a controllable tension in the machine direction of the sheet material as it is fed into the nip between one or more metal embossing rollers and rubber back-up rollers. In another embodiment, controlled tension may be transverse, that is, across the machine direction of the sheet material generally applied as it enters the nip between the embossing roller and the rubber back-up roller. Further, controlled tension may be applied both in a machine and in a transverse direction in combination in order to produce unique design results from the same embossing design surface without the need to remove or replace the roller.

In connection with my invention, conventional apparatus may be employed such as the apparatus as shown and disclosed in U.S. Pat. 3,024,154, issued Mar. 6, 1962, the disclosure of which is hereby incorporated by reference in its entirety in this application, particularly that apparatus of FIG. 1. Accordingly, my method comprises: heating a thermoplastic resin sheet material such as vinyl resin-coated fabric material to a temperature sufficient to soften the surface for embossing where necessary; interposing between the softened or embossable surface of the resin and the surface of an embossing roller a sheet material having a different, e.g., higher but controllable modulus of elasticity such as a clear synthetic polymer sheet material; pressing the surface of the resin sheet against the embossing surface; and controlling the tension on the interposed sheet material to obtain a variation in the embossing effect, depending upon the tension of the interposed material, thereby producing a thermoplastic resin sheet having an embossed surface of various designs and effects from the same surface of a single embossing roller.

Typically, it is necessary to heat the surface of the thermoplastic sheet material to a temperature sufficient to permit embossing. However, in certain circumstances, where the resin is highly plasticized or where sufficient embossing pressures are employed, heating may not be a wholly necessary step. My invention is particularly directed toward the use of a vinyl chloride resin such as a vinyl chloride-vinyl acetate copolymer or polyvinyl chloride resin which is coated on a woven textile fabric as a base. The vinyl resin may be a plasticized vinyl resin of a noncellular or of a cellular nature where a blowing agent is employed. Further, in some situations, in my invention it is advantageous to employ an interposed sheet material which not only performs the function of varying the embossed surface design on the thermoplastic material, but which also forms a unitary integral top or coating on a part of the ultimate product to be produced, particularly, where the interposed sheet material is of a translucent, transparent or clear nature so as to form protective coating on the embossed thermoplastic film. In such situations, the interposed sheet material need not be stripped away from the embossed surface after the embossing step, but remained bonded to the vinyl resin in place. Where the interposed sheet material is to form a part of the ultimate product, then it need not have the characteristic of not adhering to the softened thermoplastic resin surface at the embossing temperature, but rather the opposite; it should be capable of adhering or being adhered to such surface by the compatible nature of the material itself or by the use of an adhesive or tie-in-coating placed on the surface of either or both sheets.

Typically, the sheet materials to be interposed are synthetic rubber or plastic sheet materials. Although the exact nature of my invention is not understood and I do not wish to be bound by any particular theory of operation, it is believed that maintaining tension prevents the surface being embossed from closely contacting the embossing surface which together with a nondriven embossing roller and a driven rubber back-up roller permits some slippage of the material during embossing and unique design surface effects are obtained form a combination of such effects.

Such interposed sheet material should be nonadhering to the softened or thermoplastic resin surface at the embossing temperatures employed and typically be from about one to ten times thinner than the thermoplasic resin sheet material on which the embossing design is to be placed. It is also desirous at times to have the interposed synthetic sheet material to be clear, transparent or translucent so that the operator during the production may be able to determine visually and view the embossing processes. After being embossed under controlled temperatures, the sheet material may be stripped away and then reused several times or, if desired, heated slightly to relax the sheet and remove any residual embossing impression on the sheet material before reused. Thus the sheet material to be employed in my invention should not include those essentially nonstretchable materials having a very low modulus elasticity such as a glass or metal. Typical synthetic resin sheet materials which may be usefully employed include: polyester resins such as Mylar, e.g., polyethylene terephthalate; vinyl resin materials such as styrene resins and vinyl chloride resins, e.g., polyvinyl chloride, cellophane; olefinic resins such as the polyethylene, polypropylene and ethylene-propylene copolymers; polyamides, e.g., nylon, acrylic resins; fluorocarbons such as Teflon and similar materials. The selection of a particular interposed material will, of course, depend in part upon the thermoplastic film material to be embossed and the product desired.

The embossable thermoplastic film material may be any thermoplastic resin or polymeric material such as a vinyl resin such as vinyl chloride resins, e.g., polyvinyl chloride, styrene resins such as polystyrene, olefinic resins such as polyethylene, polypropylene, acrylic resins, urethane resins and other thermoplastic resins subject to deformation by heat or pressure or a combination thereof. Typically, such resins contain various plasticizers, stabilizers, pigments, fillers, blowing agents and the like which may be employed. The embossing may take place on a cellular or noncellular sheet or surface, or if desired, the embossing may take place on a noncellular surface and the material then subsequently heated to a temperature sufficient to decompose the blowing agent and to provide then an embossed cellular layer. The thermoplastic resin material may be a thermoplastic film alone or with other thermoplastic film or sheet material or more typically may be a calendered or coated thermoplastic resin which is placed and secured onto a base sheet material, e.g., by coating a vinyl plastisol onto a fabric base and gelling the plastisol.

Typical base materials include a paper such as stretchable paper or woven or nonwoven textile fabrics or materials which may be a stretchable or nonstretchable material, e.g., a knit stretch material, depending upon the ultimate use of the embossed thermoplastic coated resin material. The use of a thermoplastic coated material which has some stretch such as thin lightly woven materials or a stretchable synthetic yarn provides a unique variety of designs on embossing, since the thermoplastic material may also be controlled in tension like the interposed sheet material, giving two sheet materials to control and vary the design effects. Materials which may be used as base materials include woven and nonwoven, natural and synthetic, organic and inorganic materials such as paper or other cellulosic sheet material, glass fibers, resins, cotton, wool, Nylon, urethane fibers, polyesters, acrylics, rayon, asbestos and carbon, fibers and blends thereof.

My invention concerns the use of a plasticized vinyl chloride resin-coated fabric as the thermoplastic resin material to be embossed and a thin Mylar sheet material interposed between the cold metal design surface of a nondriven embossing roller and a driven rubber back-up roller as in the apparatus of FIG. 1 of U.S. Pat. 3,024,154. However, it should be recognized that the interposed sheet material may also be employed as a portion of an endless belt which is maintained under the desired tension at least in the embossing nip, whereby the tension on the endless belt can be varied by a movement of a roller or other means so that various effects can be obtained by varying the tension in the endless belt on the embossing surface. The interposed sheet material may be maintained under tension through the use of a pony brake on the unwind axis of the interposed sheet material of roller 2 or 3, both in FIG. 1. In addition, tension may be controlled by movement of roller 3 against the sheet material. By observing the embossed surface and changing the tension, the embossed surface of the thermoplastic film material employed will vary in surface design. For example, variety of embossed crushed leather designs from a single leather-type embossing roller can be obtained. Of course, various modifications of my method may be made as set forth above in order to obtain products of various surface design. The surface design can be also varied by employing the same tension and the same embossing surface, but substituting one or more different interposed sheet materials as a multiple laminate; that is, by varying the modulus of elasticity of the sheet material so interposed. In another embodiment, two or more thin interposed sheet materials of the same or different materials with varying coefficients of elongation may be used and each sheet material separately controlled to produce a variety of design effects. The amount of tension to be used varies with the design differences desired. In general, the sheet material interposed should be taut on going into the nip between the rubber back-up roller and cold metal embossing rubber. The more tension applied, the greater is the design change from the embossing design on the roller surface. It is also most desirable to employ a driven back-up roller, but a cold, i.e., a lower temperature, embossing roller, e.g., 10 to 50° F., lower than the thermoplastic resin sheet temperature. The embossing roller should also not be driven, but free so that slippage of the sheet material may occur to alter the design and give a random effect.

What I claim is:

1. A method of providing a variation in embossing surface design to the surface of thermoplastic resin sheet material by employing a single embossing design which method includes:

(a) interposing between the surface of a thermoplastic resin sheet material to be embossed and the embossing design surface, such as an embossing roller, a thin sheet material having a different modulus of elasticity than the sheet material to be embossed;

(b) embossing the thermoplastic resin sheet material; and (c) controlling the tension of the interposed sheet material during the embossing step so as to provide a variation in surface embossing effect on the surface of the embossed thermoplastic resin sheet material.

2. The method of claim 1 wherein the thermoplastic resin sheet material comprises a plasticized vinyl chloride resin coated on a fabric base.

3. The method of claim 1 wherein the sheet material is selected from the group of synthetic polymeric sheet materials consisting of cellophane, fluorocarbon, polyester, polyethylene and polypropylene.

4. The method of claim 1 wherein when tension is applied to the sheet material in a machine direction by the application of a braking force to the unwind axle of the interposed sheet material.

5. The method of claim 1 wherein the interposed sheet material comprises an endless belt in which tension is controlled within the endless belt.

6. The method of claim 1 wherein after the embossing step, the interposed sheet material is stripped from the thermoplastic resin sheet material.

7. The method of claim 1 wherein the interposed sheet material comprises a transparent synthetic resin sheet material adapted to bond to the thermoplastic resin surface during the embossing step.

8. The method of claim 1 wherein the embossing is carried out between a driven rubber back-up roller and a cold nondriven embossing roller.

9. The method of claim 1 wherein more than one interposed sheet material of different modulus of elasticity is interposed and the tension of each sheet material controlled.

10. The method of claim 1 wherein the thermoplastic resin sheet material contains a blowing agent, and after embossing the resin sheet material, is heated to a temperature sufficient to decompose the blowing agent and provides a cellular embossed surface design.

References Cited

UNITED STATES PATENTS

| | | | |
|---|---|---|---|
| 2,877,151 | 3/1959 | Doherty et al. | 156—209 |
| 3,046,173 | 7/1962 | Copeland | 156—209X |
| 3,236,926 | 2/1966 | Wisotzky | 156—209X |
| 3,445,886 | 5/1969 | Lemoine et al. | 264—288X |

LELAND A. SEBASTIAN, Primary Examiner

S. HELLMAN, Assistant Examiner

U.S. Cl. X.R.

156—209, 229; 264—288